United States Patent [19]

McMaster

[11] Patent Number: 4,598,592
[45] Date of Patent: Jul. 8, 1986

[54] APPARATUS FOR DETERMINING THE FATIGUE CONDITION OF A STRUCTURE

[75] Inventor: Robert C. McMaster, Delaware, Ohio

[73] Assignee: JACA Corporation, Fort Washington, Pa.

[21] Appl. No.: 546,970

[22] Filed: Oct. 31, 1983

[51] Int. Cl.$^4$ .................................... G01M 5/00
[52] U.S. Cl. ............................... 73/786; 73/787; 310/348
[58] Field of Search ............... 73/786, 787, 799, 801, 73/587, 761; 310/348, 354, 369

[56] References Cited

U.S. PATENT DOCUMENTS

| | | | |
|---|---|---|---|
| 3,628,377 | 12/1971 | Weiss | 73/787 |
| 3,713,127 | 1/1973 | Keledy et al. | 73/799 |
| 4,010,679 | 3/1977 | Dybel | 310/354 |
| 4,127,788 | 11/1978 | Daugherty | 73/761 |

Primary Examiner—Anthony V. Ciarlante
Attorney, Agent, or Firm—Weiser & Stapler

[57] ABSTRACT

Electrical signals, representative of stress induced in a structure, are developed by a piezoelectric transducer (10) attached to the structure in response to stress changes in the structure caused by loads applied to the structure. The signals storage signals from the electrical signals and the storage are processed by a signal processing circuit (12) to develop signals are accumulated by a storage unit (14) to develop a fatigue condition indication of the cumulative effect of the loads applied to the structure.

31 Claims, 6 Drawing Figures

# APPARATUS FOR DETERMINING THE FATIGUE CONDITION OF A STRUCTURE

TECHNICAL FIELD

The present invention relates, in general, to fatigue testing of structural parts and, in particular, to determining the stress change history of structural parts by accumulating data representative of the stresses to which such parts are exposed while in service. Although the invention will be described in connection with its use in monitoring and recording the stress change history of a bridge, it will be apparent that it has broader application and can be used in monitoring other dynamically loaded structures, such as oil drilling rigs and ocean platforms, radio and television transmitters, vehicles such as trucks, railroad cars, earth moving machines and cranes, ship structures, building structures, machines, hoists, cables, and the like.

BACKGROUND ART

The inspection of bridges for tne purpose of determining physical condition and subsequent corrective action to eliminate unsafe situations is a large and complex task. In the United States, there are over a half million highway bridges requiring large numbers of personnel to gather and evaluate data concerning various factors influencing the physical integrity of these bridges. One of the more important factors is the fatigue condition of the structural members of the bridge and the components which fasten together the structural members. As the bridge is exposed time varying loads caused by the passage of vehicles over the bridge, the structural members and fastener components may crack or rupture or be subjected to fatigue damage by the alternating application and relaxation of stresses caused by these loads. The net effect on these parts is dependent upon the magnitude and frequency of the applied loads.

Various solutions to the problems introduced by fatigue have been put into use in the past. One approach to the fatigue problem has been to routinely replace critical parts without regard as to whether or not these parts actually have been damaged. This is quite wasteful and expensive. Moreover, if the replacement is limited to selected critical parts, the fatigue condition of other parts is ignored.

Another approach has employed non-destructive testing methods to determine the condition of bridge parts. Specialized instrumentation, based for example on materials evaluation by means of x-rays, ultrasonics, stereophotogrammetry or other tests, can be used to examine structural members and fastener components on a scheduled basis to determine if a part has been damaged and requires replacement. One shortcoming of this approach is the possibility of damage occurring resulting in failures between examinations. In addition, test instruments which have been used to inspect bridges are fairly sophisticated, relatively expensive and require operation by skilled personnel.

Strain gages have been used to monitor the stresses to which bridge parts are exposed. They are externally applied and have limited life. Data developed over this limited time is assumed representative of that over an extended period of time. Sometimes certain conclusions about the past are drawn or predictions about the future are made from these inadequate data. The risks of this technique are apparent. There is no assurance that the loads to which the bridge is subjected during the limited periods of monitoring accurately represent the bridge loading over longer periods of service.

As a practical matter, the use of strain gages to monitor the stresses induced in bridge parts is usually restricted to limited periods of time. Strain gages require external sources of power and usually the strain gage unit is powered by a battery. Because batteries become discharged or wear out, they must be replaced at regular intervals. In addition, special care is required to protect the battery against destruction or premature failure of the battery which can result from exposure to the environment. This adds cost to such units. Furthermore, strain gages are typically mounted on exposed surfaces of members where they are subject to vandalism or may be damaged by storms or vehicle accidents.

Still another technique employed in the past to monitor stresses to which bridge parts are exposed has made use of a piezoelectric unit as an acoustic emission detector and measuring device. When a part is subjected to a load, accoustic emission occurs. By analyzing the emission, information about the load may be developed. A serious problem with this technique is that arrays of acoustic transducers with sophisticated instrumentation and extensive wiring are required to determine precisely the source and location of the emission being analyzed. As a result, arrangements of this type are not particularly suitable for monitoring bridge members and similar parts. Also, if surface mounted, they are susceptible to storms, accidents and vandalism.

DISCLOSURE OF THE INVENTION

It is an object of the present invention to provide new and improved apparatus for determining the dynamic stress change history of a structure.

It is another object of the present invention to provide such apparatus which is reliable in operation.

It is yet another object of the present invention to provide such apparatus which is self-powered and thereby avoids the need of an external power source.

It is still another object of the present invention to provide apparatus which provides an indication of the cumulative effect of stresses to which a structural member has been subjected.

It is a further object of the present invention to provide apparatus which provides an indication of the failure of a load-bearing part.

It is still a further object of the present invention to provide such apparatus which is relatively simple in contstruction and inexpensive to fabricate and operate.

Apparatus for determining the stress change history of a structure, constructed in accordance with the present invention, includes a piezoelectric transducer adapted for attachment to a structure and responsive to stress changes in the structure caused by the application of loads to the structure for developing electrical signals representative of stress changes applied to the structure. Also included are circuit means responsive to the electrical signals for processing these signals to develop storage signals from the electrical signals. The apparatus further includes storage means responsive to the storage signals for storing the storage signals to develop a stress change history indication of the cumulative effect on the structure of loads applied to the structure.

BRIEF DESCRIPTION OF DRAWINGS

Referring to the drawings.

BEST MODE OF CARRYING OUT THE INVENTION

Figure 1:
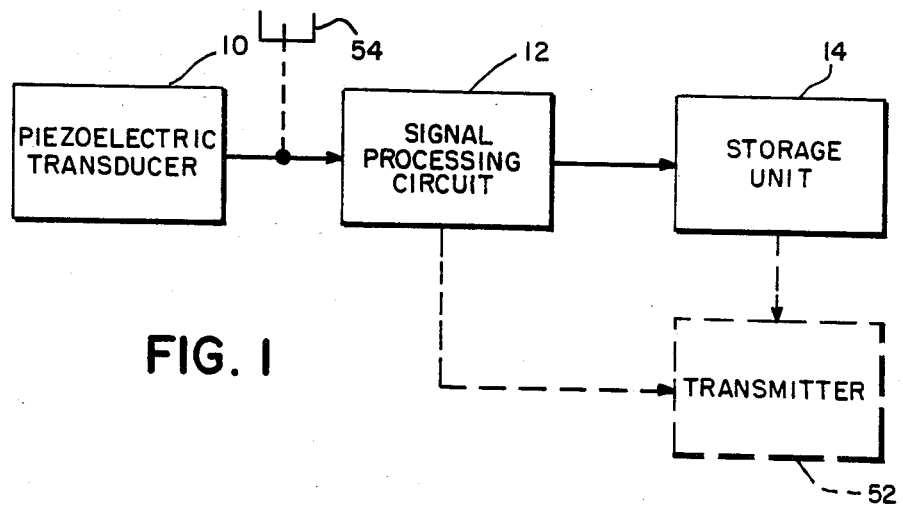
FIG. 1 is a block diagram of apparatus for determining the fatigue condition of a structure constructed in accordance with the present invention.

Referring to FIG. 1, the apparatus of the present invention includes a piezoelectric transducer 10 adapted for attachment to a structure and responsive to stress changes in the structure caused by the application of loads to the structure for developing electrical signals representative of stress changes applied to the structure. A signal processing circuit 12, responsive to the electrical signals developed by piezoelectric transducer 10, processes these signals to develop storage signals. The storage signals are stored by a storage unit 14 which develops a stress change history indication of the cumulative effect on the structure to which piezoelectric transducer 10 is attached of loads applied to the structure.

The stress change history indicated by storage unit 14 can be used a number of ways. For example, the cumulative effect on the structure of the stresses may be compared against the fatigue life for which the structure has been designed to determine the remaining life of the structure. Also, the stress change history for a prescribed period may be compared against the stress change history for a comparable period to identify failures in the structure.

Figure 2:
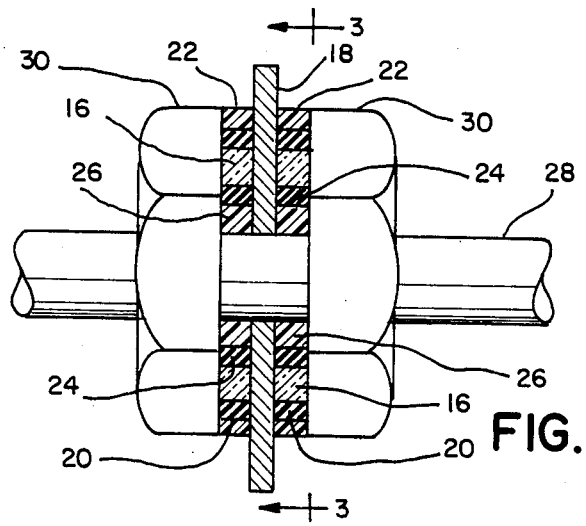
FIG. 2 is a front view, partly in section, of a piezoelectric transducer which may be used in the FIG. 1 apparatus.
Figure 3:
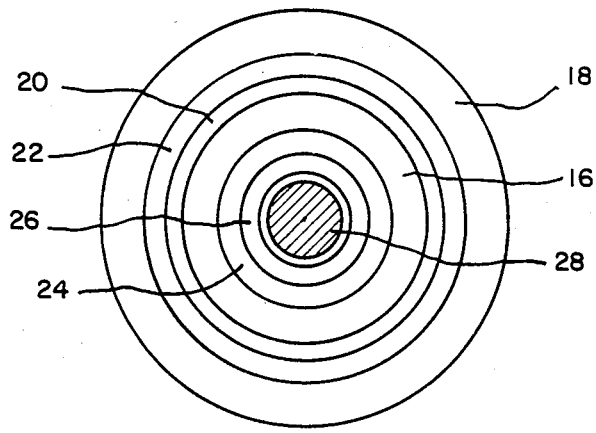
FIG. 3 is a vertical section taken along line 3—3 of FIG. 2.

Referring to FIGS. 2 and 3, the piezoelectric transducer may include two piezoelectric elements 16, each in the form of a ring, positioned at opposite faces of a copper electrode 18 which is in the form of a disc. Each such crystal is surrounded by a silicone rubber ring 20 which, in turn, is surrounded by a melamine constraint ring 22. Within each crystal are a silicone rubber packing ring 24 and a melamine ring 26. The foregoing components are mounted on a central steel shaft 28 and held in place by a pair of nuts 30 which engage mating threads on the shaft.

As an external load is applied to the transducer and the stresses applied to crystals 16 change in response to this load, an electrical signal is developed at copper electrode 18 which is representative of the applied load. For example, the external load may be an axial tension or compression load applied between the outside faces of nuts 30. Shaft 28 and nuts 30 serve as electrical ground.

Crystals 16 are able to withstand very large threedimensional compressive stresses but are not able to withstand shear, tension or impact forces, such as those encountered in bridge structures. If left unprotected from such shear, tension or impact forces, the crystals might shatter. In order to prevent this damage from occuring, the piezoelectric transducer is preloaded to pre-stress each of the crystals in three mutually perpendicular directions by the application of compressive forces to the crystals. This may be accomplished, for the embodiment illustrated, by turning nuts 30 to axially compress cyrstals 16. As such a preload is applied equally and from opposite directions along the axis of shaft 28, each crystal is pre-stressed along its thickness direction along which tension and compression forces are applied. In addition, by forming rubber rings 20 and 24 to have a thickness greater than the crystals they surround, the rubber rings are compressed axially as the axial load is applied and rings 20 distort radially inward against the crystals while rings 24 distort radially outward against the crystals. By applying radially inward and radially outward compressive forces against the crystals, the crystals are pre-stressed radially. The degree of pre-stress of the crystals is selected to exceed the anticipated maximum tensile stress and to assure that whatever the magnitude of the tension, shear or impact forces caused by a dynamic load, the crystal will remain in a state of three dimensional compression and not shatter.

Figure 4:
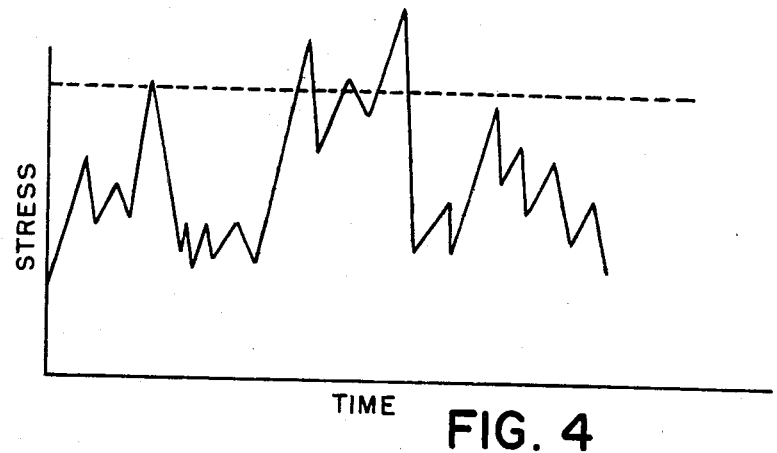
FIG. 4 is a waveform diagram representative of the stresses induced in a structure when a load is applied to the structure.

FIG. 4 is a waveform diagram representative of the stress conditions of a structure to which an external load has been applied. As an external load is applied and removed, for example the passage of a vehicle over a bridge, the stress in the structure fluctuates.

A piezoelectric transducer, subjected to the same stress conditions, develops an electrical signal which is the first derivative of the waveform of FIG. 4. In other words, the signal from the piezoelectric transducer represents the rate of change of the stress developed in the part being monitored.

Signal processing circuit 12 of FIG. 1 may take various forms depending upon the nature of storage unit 14, the types of information to be derived from the electrical signals developed by piezoelectric transducer 10, and the ways in which such information is to be used. In its simplest form, signal processing cirucit 12 may include an attenuator circuit and components for coupling the electrical signals from piezoelectric transducer 10 to storage unit 14. The attenuator circuit serves to reduce the large voltage signals developed by the piezoelectric transducer to a level for use with the storage unit.

Likewise, storage unit 14 also may take various forms. One type of storage unit which is particularly suited for use in the present invention is an integrating unit, such as a coulombmeter. Typically, a coulombmeter in accordance with the present invention generally includes a pair of electrodes, one, for example, being silver, which are separated by a medium which permits silver to migrate from the silver electrode to the other electrode in response to the application of an electrical signal between the two electrodes. The amount of silver deposited on the second electrode is dependent upon the magnitude and duration of the applied electrical signal. The total build-up of silver, over a period of time, represents the accumulation of electrical signals applied to the device over this period of time and may be determined by electrical resistance measurements.

Figure 5:
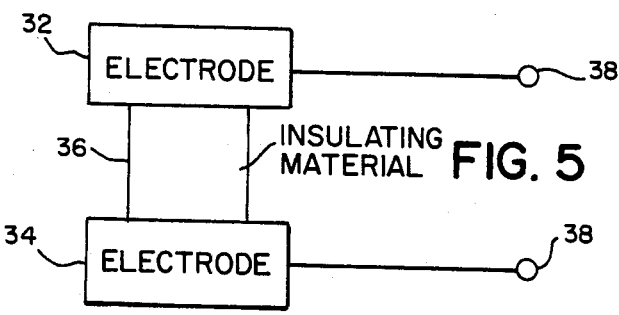
FIG. 5 is a schematic diagram of a storage unit which may be used in the FIG. 1 apparatus.

FIG. 5 shows schematically a preferred form of a coulombmeter which may be used in the present invention. This unit includes a pair of electrodes 32 and 34 separated by a short length of insulating material, such as glass 36. As a signal is applied between electrodes 32 and 34, silver particles migrate from silver electrode 32 toward the other electrode 34 along the surface of glass 36 and become deposited on the glass surface to form a conducting layer. As this happens, resistance measurements taken at terminals 38 will change accordingly. Other materials besides silver and glass may be used for the electrode and the insulating material.

Use of a storage unit, such as the coulombmeter shown in FIG. 5, requires the introduction of a rectifier unit in signal processing circuit 12. The polarity of the electrical signals developed by piezoelectric transducer 10 is dependent upon the changes of the external load applied to the structure. Loads causing compression of the member being monitored generate signals of one polarity, while loads causing tension generate signals of an opposite polarity. Whatever the direction of the load, the structure is stressed and the fact that it is stressed is of interest. In the absence of a rectifier, opposite polarity signals, when applied to a coulombmeter, would remove silver from the second electrode and cause the silver to return to the silver electrode. Besides not recording such stresses of the structure, indications of stresses caused by oppositely directed loads are cancelled. By including a full-wave rectifier in signal processing circuit 12, all the storage signals developed by the signal processing circuit have the same polarity, regardless of the nature of the external load and the indication developed by storage unit 14 represents stresses induced in the structure, caused by both tensile and compressive loads.

Figure 6:
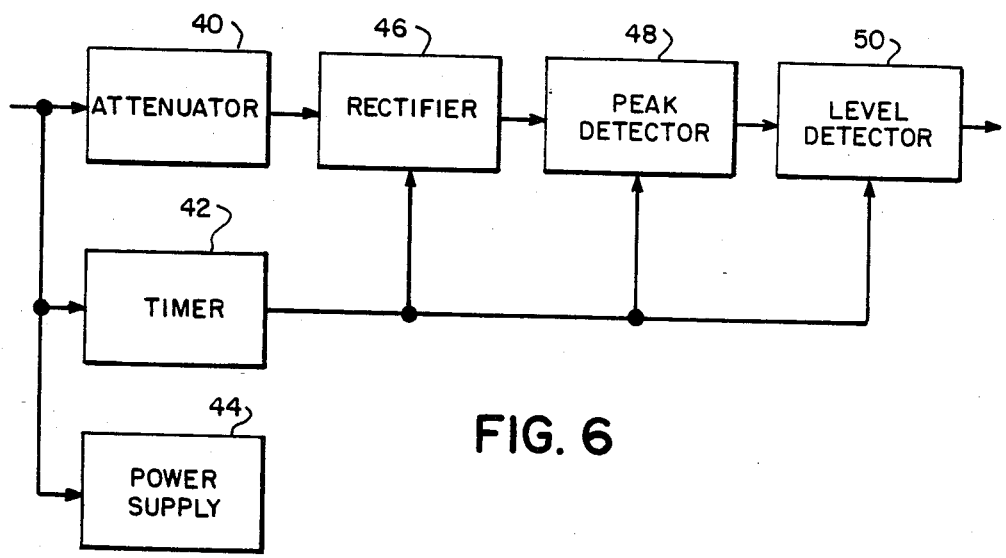
FIG. 6 is a block diagram of an embodiment of a signal processing circuit which may be used in the FIG. 1 apparatus.

FIG. 6 is a block diagram of one embodiment of a signal processing circuit which may be used in the present invention. Electrical load signals from the piezoelectric transducer are simultaneously supplied to an attenuator 40, a timer 42, and a power supply 44. Attenuator 40 serves to reduce the electrical load signals to a level at which they eventually may be supplied to the storage unit after being processed.

The attenuated electrical load signals are supplied to a rectifier 46 which produces storage signals of the same polarity. These storage signals may be supplied directly to the storage unit or, as shown, they may first pass through a peak detector 48 and a level detector 50. The peak detector may be provided if information concerning the magnitude and frequency of specific loads is desired.

Level detector 50 is particularly useful when the structure being monitored is fabricated from a material having an endurance limit. The endurance limit of a material is that stress level below which an applied load has virtually no effect on the fatigue life of a part made from that material. The dashed line in the waveform of FIG. 4 represents the endurance limit. In order to discriminate between electrical signals from piezoelectric transducer 10 developed from stresses above and below the endurance limit of the structure being monitored, level detector 50 may be provided. This unit functions to pass to storage unit 14 only those signals developed in response to stresses which are in excess of the endurance limit. As a result, storage unit 14 develops an indication of the fatigue condition of the structure from only those signals which affect the fatigue life of the structure. For structures made from materials not having an endurance limit, level detector 50 would be eliminated from signal processing circuit 12. Attenuator 40, rectifier 46, peak detector 48 and level detector 50 all may be of conventional construction and operation.

Timer 42, also of conventional construction and operation, serves to develop timing signals to control the operation of rectifier 46, peak detector 48 and level detector 50, if other information besides cumulative stress is desired. For example, indications of the durations of the loads may be developed. When applied to a bridge construction, this information may be used to detemine the speed of a vehicle crossing the bridge.

Power supply 44 serves to develop, from the electrical signals, power required to operate the components of the signal processing circuit. The magnitude of the electrical power output from piezoelectric transducer 10 is dependent upon the number and size of the piezoelectric elements 14. The transducer can be arranged to provide sufficient power to operate the circuitry for processing the information signals as well as transmitting useful information representative of the stresses to which the structure has been subjected. In this way, external power is not required. Instead, the forces which subject the structure to stresses and about which information is developed are the original source of power. Power supply 44 also may be of conventional construction and operation.

Piezoelectric transducers of the type which are usable in the present invention can be attached to the structure being monitored either as a component which is specially adapted to form part of the structure being monitored or they can be secured to the structure being monitored to function strictly as a sensing member. For example, shaft 28 in FIG. 2 may be the shank portion of a structural bolt and crystals 16 and the associated parts may be arranged as a washer unit under the head of the bolt or under a mating nut. Alternatively, the piezoelectric transducer can be arranged to be secured externally to a structural part which is to be monitored.

FIG. 1 shows a transmitter 52 in dashed lines. This is intended to indicate that the apparatus of the invention may be arranged to transmit the various types of information to a remote location instead of requiring that a reading be taken at the location of the apparatus. The electrical signals developed by piezoelectric transducer 10 are large enough to power a transmitter, so that an external source of power is not required. In this way, the continuously developed indication of fatigue condition may be received at a location remote from the site of the structure and hazardous conditions can be discovered immediately.

Alternatively, the output storage signals from signal processing circuit 12 may be transmitted to a remote location at which the storage unit is located and the stress change history indication is developed at this remote location. Also, both the signal processing circuit and the storage unit may be located at a remote location, in which case only the piezoelectric transducer is positioned on the structure being monitored. For this arrangement, the electrical signal output from the piezoelectric transducer is transmitted to a remote location by means of an antenna 54.

While in the foregoing there have been described preferred embodiments of the present invention, it should be understood by those skilled in the art that various modifications and changes can be made without departing from the true spirit and scope of the invention as recited in the claims.

I claim:

1. Apparatus for determining the stress change history of a structure, said apparatus comprising:
   piezoelectric transducer means including a shaft in load bearing association with said structure, and a piezoelectric element surrounding said shaft and retained in compression between opposing members so that said piezoelectric transducer means is responsive to stress changes in said structure caused by the application of loads to said structure for developing electrical signals representative of stress changes applied to said structure;

circuit means responsive to said electrical signals for processing said electrical signals to develop storage signals from said electrical signals; and storage means responsive to said storage signals for storing said storage signals to develop a stress change history indication of the cumulative effect on said structure of loads applied to said structure.

2. Apparatus according to claim 1 wherein the piezoelectric component of said transducer means is compressively pre-stressed in the direction along which tension and compression forces are applied.

3. Apparatus according to claim 2 wherein the piezoelectric component of said transducer means is compressively pre-stressed in three mutually perpendicular directions.

4. Apparatus according to claim 3 wherein said storage means include an integrating unit which accumulates said storage signals.

5. Apparatus according to claim 4 wherein said circuit means include a full-wave rectifier for developing storage signals of the same polarity from electrical signals representative of both tensile and compressive loads.

6. Apparatus according to claim 5 wherein said circuit means include level sensing means for developing storage signals only from electrical signals which exceed a predetermined level representative of the endurance limit of said structure.

7. Apparatus according to claim 3 wherein said circuit means are powered by said electrical signals.

8. Apparatus according to claim 1 wherein said storage means include an integrating unit which accumulates said storage signals.

9. Apparatus according to claim 8 wherein said circuit means include a full-wave rectifier for developing storage signals of the same polarity from electrical signals representative of both tensile and compressive loads.

10. Apparatus according to claim 1 further including a transmitter means responsive to said storage means for transmitting said stress change history indication to a remote location.

11. Apparatus according to claim 1 further including a transmitter means responsive to said circuit means for transmitting said storage signals to a remote location and said storage means are located at said remote location.

12. Apparatus according to claim 1 further including transmitter means responsive to said piezoelectric transducer means for transmitting said electrical signals to a remote location and said circuit means and said storage means are located at said remote location.

13. Apparatus according to claim: 1 wherein said piezoelectric transducer means is an integral element of said structure.

14. Apparatus according to claim 1 wherein said circuit means and said storage means are remote from said transducer means and the structure to which it is attached.

15. Apparatus according to claim 14 wherein said transducer means is operable without an external power supply.

16. Apparatus according to claim 15 wherein said transducer means is capable of transmitting said stress change history indication to said circuit means and said storage means, without connecting leads.

17. Apparatus according to claim 1 wherein said transducer means further comprising an electrode in electrical contact with said piezoelectric element, and a pair of nuts engaging said shaft and retaining said piezoelectric element therebetween.

18. Apparatus according to claim 17 wherein said piezoelectric element is compressively pre-stressed by said retaining nuts.

19. Apparatus according to claim 17 wherein a pair of piezoelectric elements surround said shaft in annular spaced relation to one another.

20. Apparatus according to claim 17 wherein a pair of piezoelectric elements are separated by said electrode and retained between said retaining nuts.

21. Apparatus according to claim 17 wherein said piezoelectric element is surrounded by compressible members.

22. Apparatus according to claim 21 wherein said compressible members are surrounded by resilient members.

23. Apparatus according to claim 1 wherein said storage means is a coulombmeter.

24. Apparatus according to claim 23 wherein said coulombmeter comprises a pair of electrodes separated by an insulating material such that a signal applied between said electrodes causes a conducting layer to form on said insulating material, whereby resistance measurements between said electrodes vary in accordance with said signal.

25. Apparatus according to claim 24 wherein said electrodes are silver and said conducting layer is a result of silver migration responsive to said signal.

26. Apparatus according to claim 24 wherein rectifier means operatively couple said coulombmeter to said transducer means.

27. Apparatus according to claim 1 wherein said transducer means, said circuit means and said storage means are operable without an external power supply.

28. Apparatus for determining the stress change history of a structure, said apparatus comprising:

a piezoelectric transducer adapted for attachment to a structure, responsive to stress changes in said structure caused by the application of loads to said structure for developing electrical signals representative of stress changes applied to said structure, and comprising a shaft adapted for attachment to said structure, a piezoelectric element surrounding and spaced from said shaft, an electrode in electrical contact with said piezoelectric element, and a pair of nuts engaging said shaft and retaining said piezoelectric element therebetween;

cirucit means responsive to said electrical signals for processing said electrical signals to develop storage signals from said electrical signals; and storage means responsive to said storage signals for storing said storage signals to develop a stress change history indication of the cumulative effect on said structure of loads applied to said structure.

29. Apparatus according to claim 28 wherein said storage means comprises a pair of electrodes separated by an insulating material such that a signal applied between said electrodes causes a conducting layer to form on said insulating meaterial, whereby resistance measurements between said electrodes vary in accordance with said signal.

30. Apparatus according to claim 28 wherein said apparatus is operable without an external power supply.

31. A piezoelectric transducer for attachment to a structure and responsive to stress changes in said structure caused by the application of loads to said structure for developing electrical signals representative of stress changes applied to said structure, comprising:
 a shaft for attachment to said structure;
 a piezoelectric element surrounding and spaced from said shaft;
 an electrode in electrical contact with said piezoelectric element; and
 a pair of nuts engaging said shaft and retaining said piezoeletric element in compression therebetween.

* * * * *